Jan. 29, 1952  F. CHASSAING  2,583,683
METHOD OF MANUFACTURING RUBBER
ARTICLES FROM SENSITIZED LATEX
Filed March 30, 1949  4 Sheets-Sheet 1

INVENTOR
FRANÇOIS CHASSAING
BY
Young, Emery & Thompson
ATT'ys.

Jan. 29, 1952 F. CHASSAING 2,583,683
METHOD OF MANUFACTURING RUBBER
ARTICLES FROM SENSITIZED LATEX
Filed March 30, 1949 4 Sheets-Sheet 2

INVENTOR
FRANÇOIS CHASSAING
By Young, Emery & Thompson
Att'ys.

Jan. 29, 1952    F. CHASSAING    2,583,683
METHOD OF MANUFACTURING RUBBER
ARTICLES FROM SENSITIZED LATEX

Filed March 30, 1949      4 Sheets-Sheet 3

INVENTOR
FRANÇOIS CHASSAING
By Young, Emery & Thompson
Attys

Jan. 29, 1952
F. CHASSAING
2,583,683
METHOD OF MANUFACTURING RUBBER
ARTICLES FROM SENSITIZED LATEX
Filed March 30, 1949
4 Sheets-Sheet 4
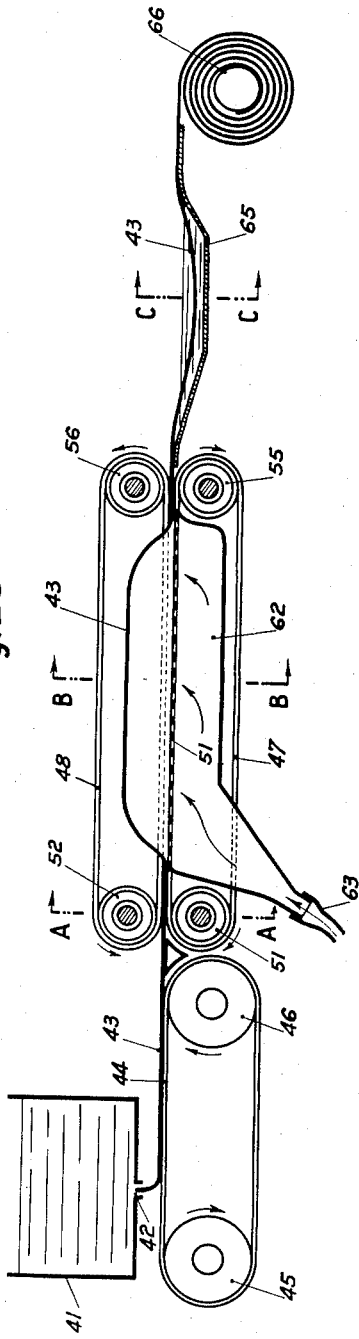
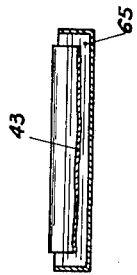
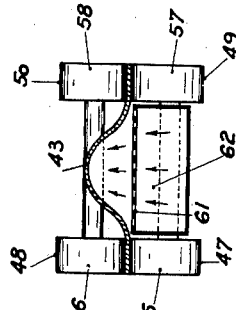
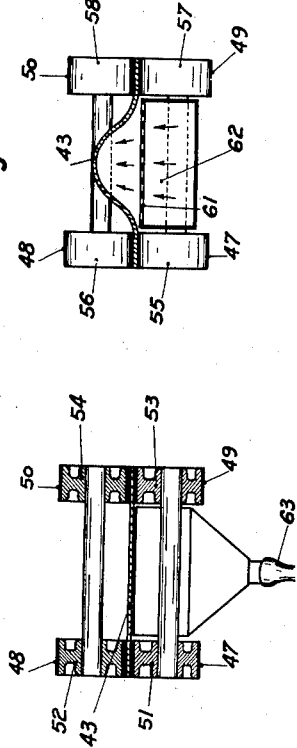
INVENTOR
FRANÇOIS CHASSAING
BY Young, Emery & Thompson
Att'ys.

UNITED STATES PATENT OFFICE 2,583,683

METHOD OF MANUFACTURING RUBBER ARTICLES FROM SENSITIZED LATEX

François Chassaing, Alfortville, France

Application March 30, 1949, Serial No. 84,298
In France May 10, 1948

4 Claims. (Cl. 18—58)

For manufacturing articles having the most variegated outlines, it is known to use sensitized latex which is poured into suitably heated moulds in order to produce the coagulation of said latex.

The coagulum obtained in a mould keeps the shape thereof and should be dried. Such drying requires much time, particularly in the case of thick articles. Moreover, it requires important equipment and ties up a great number of moulds. Finally, the coagulum detains an amount of the serum which would be advantageously removed.

This invention comprises a method in which almost the total amount of serum may be removed from the latex so as to obtain very easily a rubber wall which is very pure and not very sensitive to moisture.

According to the invention, the wall obtained by moulding and coagulation of sensitized latex is subjected to a stress causing its elongation and then released so that it contracts while expelling a large amount of serum. The wall thus obtained has an irregular surface and is heated at about 60° C. which causes a new contraction, imparting to the wall its final shape whereupon said wall may be very quickly dried.

This method may be used for manufacturing various articles such as rubber sheets, balls, inner tubes of tires, tubes, etc. The equipment used for such manufacture is exceedingly reduced, and the operations effected are simple and rapid so that the cost is very low.

Some embodiments of the method according to the invention are shown in the accompanying drawings.

In these drawings:

Figs. 1 to 8 show the successive steps of the method followed for the manufacture of a tire inner tube.

Figs. 9 to 14 relate to an alternative embodiment of the method for the manufacture of a tire inner tube.

Figure 16:
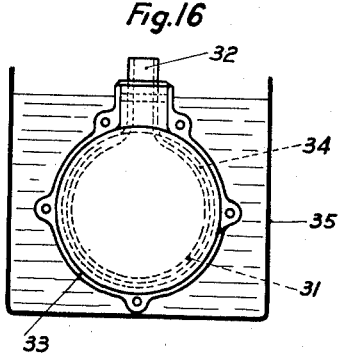

Figs. 23 to 26 relate to the manufacture of a rubber sheeting. Fig. 23 is a longitudinal sectional view of the apparatus used therefor. Figs. 24, 25 and 26 are sectional views taken on lines AA, BB, CC of Fig. 16, respectively.

When manufacturing a rubber tire inner tube or other tubular article, two concentric tubes 1 and 2 (Fig. 1) are used and after having fitted a ring-shaped cap 3 at their lower portion, sensitized latex 8 is poured between the tubes and then the upper half is closed by means of a cap 5. The whole assembly is then introduced into a tank 6 (Fig. 2) containing water 7 at a temperature of about 60° C. in order to cause the coagulation of the latex.

The tubular blank thus obtained which is shown at 8 (Fig. 3) is then closed at one end by means of a clip 11 and receives at its opposite end a nozzle 12 on which is fitted a tube 13 connected with a pump.

Figure 4:
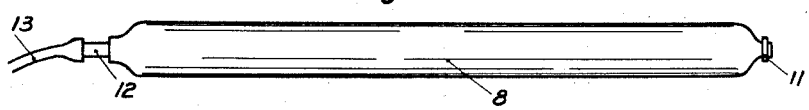
Figure 5:
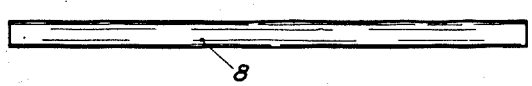

It is thus possible to introduce compressed air into tube 8 so as to dilate said tube as shown in Fig. 4.

Figure 3:

Tube 8 is then suddenly deflated and contracts to dimensions slightly greater than those of Fig. 3.

During this contraction the tube expels a great amount of the serum but assumes an irregular surface.

Figure 6:
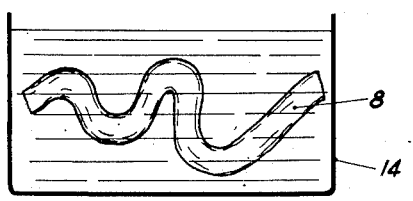
Figure 7:

Tube 8 is then immersed in water at about 60° C. contained in a tank 14 (Fig. 6) to heat the tube. This heating causes a new contraction which expels almost all the remaining serum and there is thus obtained a very uniform tube (Fig. 7) having the desired size.

Figure 8:
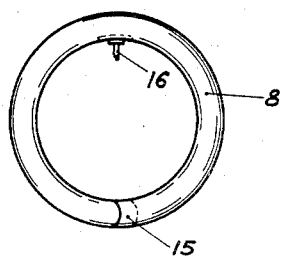

The tube is then dried and one of its two ends is introduced into the other as shown at 15 (Fig. 8) so as to unite them in a continuous torus. It is then sufficient to fit a valve 16 to complete the inner tube. The vulcanization is then effected in a known manner.

Figure 1:
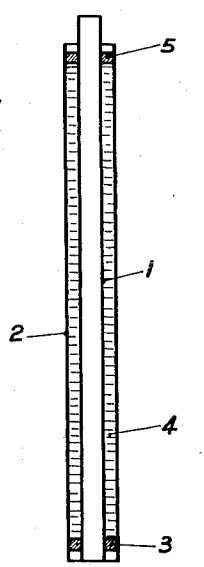
Figure 2:
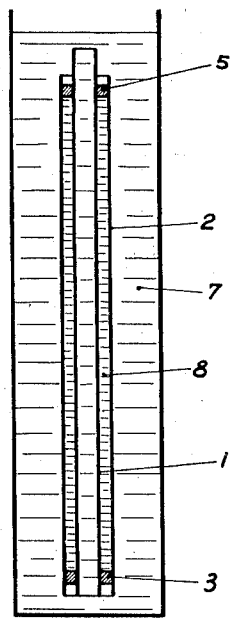
Figure 9:
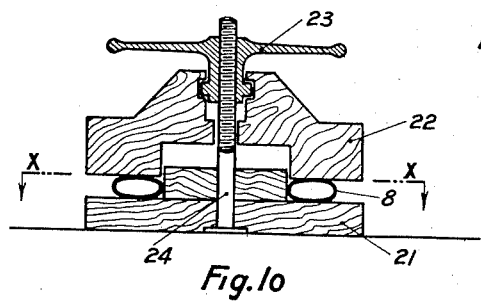
Fig. 9 is a vertical section of a pressing-machine used according to said embodiment.
Figure 10:
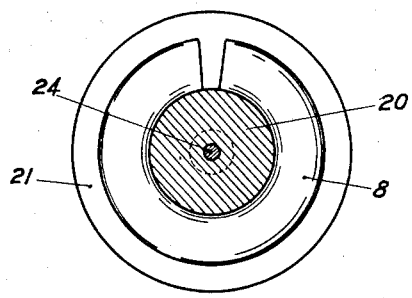
Fig. 10 is a horizontal sectional view taken on line X—X of Fig. 9.

For manufacturing a tire inner tube, it is convenient after having obtained by moulding a latex tube 8 as stated above with reference to Figs. 1 and 2, to impart to said tube a toroidal shape and to set it in a pressing-machine around a circular disc 20, between plates 21, 22 (Figs. 9 and 10). By actuating a hand-wheel 23 which is screwthreaded on the stationary rod 24, a slight compression is exerted upon the tube.

Figure 11:
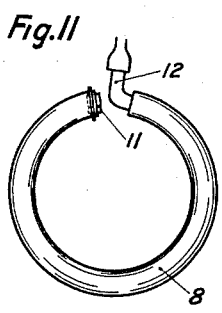
Figs. 11, 12, 13 and 14 show the further steps of the manufacture.
Figure 12:
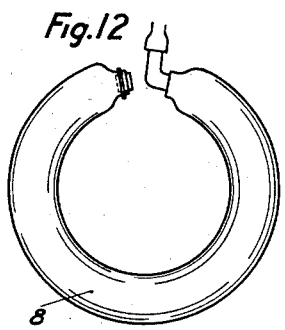
Figure 13:
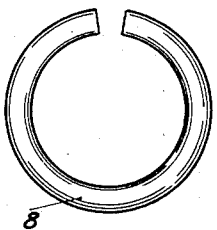
Figure 14:
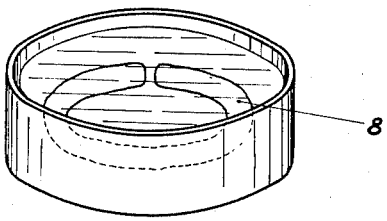
Figure 15:
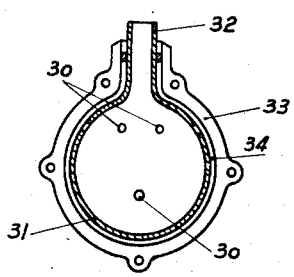
Figs. 15 to 22 show the various steps in the case of an application of the method to the manufacture of spherical articles.

Experience shows that after having been subjected to this compression, the latex tube keeps its toroidal shape. As described hereinbefore, a clip 11 and a nozzle 12 (Fig. 11) are fitted on latex torus 8 and then said torus is inflated (Fig. 12) after which the clip 11 and valve 12 are removed so that torus 8 contracts (Fig. 13) while expelling an amount of the serum. Said torus is then immersed into hot water (Fig. 14) in order to cause a new removal of serum and to give said torus its final dimensions.

When the invention is to be applied to the manufacture of hollow spherical articles, a modified process is used and will be described in connection with Figs. 15–22.

For manufacture of hollow spherical articles, there is used a mould the inner portion of which is formed by a hollow sphere 31 (Fig. 15) provided with a neck 32 and made of plaster or any other brittle material. Said sphere is preferably provided with apertures 30 which are closed for moulding by means of gum-paper. The external portion of the mould comprises two shells such as 33 bolted together against each other. Into the space comprised between the two external shells and the inner sphere is poured sensitized latex 34. The whole assembly is then heated for example by immersing it into water at about 60° C. contained within a tank 35 (Fig. 16) which causes the coagulation of the latex.

Figure 17:
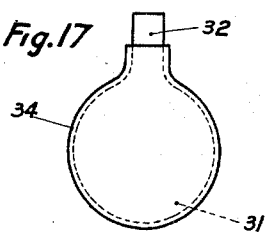
Figure 18:
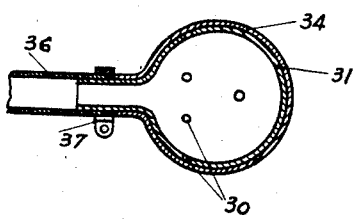

The mould is then removed from the tank and the external shells are removed, sphere 31 remaining within the latex wall 34 as shown in Fig. 17.

On neck 32 is then fitted a rubber tube 36 (Fig. 18) secured by means of a collar 37 and tube 36 is connected with a compressor. The compressed air thus introduced expels the patches of paper externally covering the apertures 30 and penetrates between the inner mould 31 and the latex sphere 34.

Figure 19:
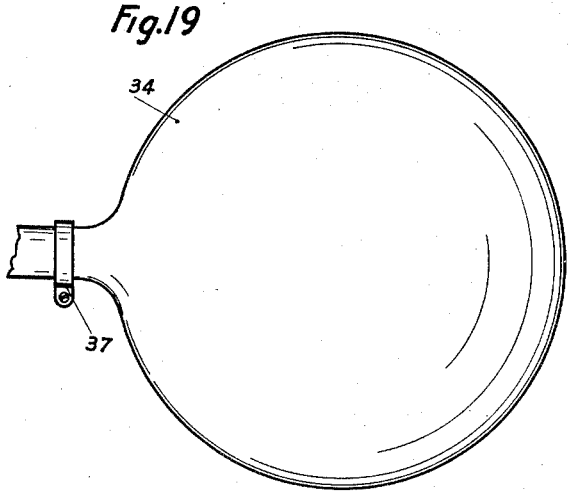
Figure 20:
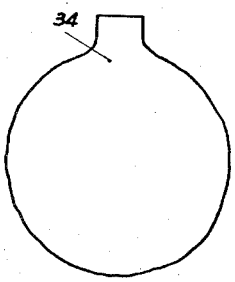
Figure 21:
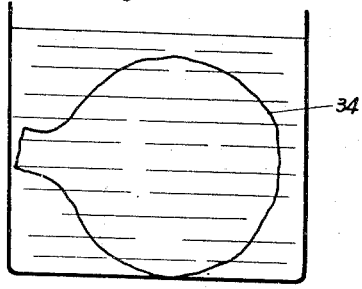
Figure 22:
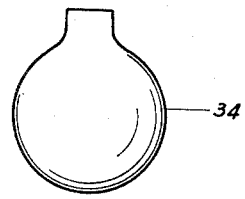

The hollow sphere 34 being inflated as shown in Fig. 19 the air contained therein is expanded so that the said sphere contracts (Fig. 20) while expelling a great amount of the serum. The mould 31 is then broken into small pieces by pressing upon wall 34 and said pieces are removed through the neck of the latex blank.

Wall 34 then has an irregular surface (Fig. 20) and it is immersed into water at about 60° C. (Fig. 21) so as to produce a new contraction with serum removal, the wall thus obtained (Fig. 22) then assuming a very smooth surface. The manufacture is completed by drying the ball and vulcanizing it according to the usual methods.

The invention may also be applied to a latex sheet. Figs. 23 to 26 show equipment used for manufacture of latex sheet.

At 41 is arranged a tank which receives the sensitized latex. Said tank is provided with a slot 42 through which a sheet 43 of sensitized latex is extruded. Said sheet is thus brought onto a conveyor 44 supported on rotating drums 45 and 46, said conveyor being heated to a temperature of about 80° C. which causes the coagulation of the latex.

The latex sheet is then carried away by two pairs of endless strips 47, 48, 49, 50 which clamp the edges of the sheet. Said strips run over suitably driven drums such as 51, 55 for strip 47 and 52, 56 for strip 48.

Between drums 51, 52, 53, 54 on the one hand and 55, 56, 57, 58 on the other hand is arranged a stationary apertured plate 61 under which is provided a chamber 62 connected through a duct 63 to a compressed air source.

Under the effect of the air incoming through duct 63 the sheet 43 expands and since it is secured on its edges by strips 47, 48, 49, 50 it assumes a bulged shape. As it runs past drum set 55, 56, 57, 58, the sheet contracts and expels a great amount of the serum after which it reaches a tank 65 full of water at about 60° C. A contraction is thus caused which eliminates the superficial irregularities while completing the serum removal.

The sheet is then rolled on a cylinder 66. It may be thereafter dried and vulcanized.

It is to be understood that the invention is in no way limited to the equipment described above which have been given merely as illustrations and that similar elements may be substituted for the various parts of said equipment within the scope of the invention.

I claim:

1. A method of manufacturing rubber articles from heat sensitized latex comprising forming an article of heat sensitized latex, heating the formed latex article to effect coagulation thereof and then eliminating nearly all of the serum retained in the formed article by first subjecting the article in air to an elongating force producing a considerable stretching thereof, secondly, relieving the elongating force to enable the stretched article to contract while in air and eliminating thereby nearly all of the moisture retained, and finally plunging the article in a bath of liquid at a temperature of about 60° C.

2. A method of manufacturing a continuous band of rubber from heat sensitized latex comprising forming a band of heat sensitized latex, heating the band to effect coagulating thereof, moving the band longitudinally, first subjecting the band in air to an elongating force producing a considerable stretching of the surface thereof by moving the band past a stream of blowing air directed against one surface of the band, while retaining transversely the edges of the band, second, moving the band away from the stream of air to enable the stretched portion of the band to contract while in air and eliminating thereby nearly all of the moisture retained, and finally running the band into a bath of liquid at a temperature of about 60° C.

3. A method of making a tire inner tube from heat sensitized latex comprising forming the inner tube from heat sensitized latex, heating the thus formed tube to effect coagulation thereof, inflating the coagulated tube while in the atmosphere by internally introducing air under pressure producing a considerable stretching of the surface thereof, relieving the air under pressure from the tube to enable the stretched tube while in the atmosphere to contract and thereby eliminate nearly all of the moisture retained, and finally plunging the tube in a bath of liquid at a temperature of 60°. C.

4. A method of making a tire inner tube from heat sensitized latex comprising forming the inner tube from heat sensitized latex, heating the thus formed tube to effect coagulation thereof, bending the so formed tube into toroidal shape, compressing the tube when in the toroidal shape, inflating the coagulated tube while in the atmosphere by internally introducing air under pressure producing a considerable stretching of the surface thereof, relieving the air under pressure from the tube to enable the stretched tube while in the atmosphere to contract and thereby eliminate nearly all of the moisture retained, and finally plunging the tube in a bath of liquid at a temperature of 60° C.

FRANÇOIS CHASSAING.

REFERENCES CITED

The following references are of record in the file of this patent:

UNITED STATES PATENTS

| Number | Name | Date |
| --- | --- | --- |
| 1,209,308 | Lanhoffer | Dec. 19, 1916 |
| 1,941,200 | Chapman | Dec. 20, 1933 |
| 2,091,364 | Joss | Aug. 31, 1937 |
| 2,248,898 | Ross | July 8, 1941 |
| 2,378,882 | Habib | June 19, 1945 |